United States Patent [19]

Oosterbaan et al.

[11] 4,418,275

[45] Nov. 29, 1983

[54] DATA HASHING METHOD AND APPARATUS

[75] Inventors: DuWayne D. Oosterbaan, Escondido; Gerard J. Williams, Valley Center, both of Calif.

[73] Assignee: NCR Corporation, Dayton, Ohio

[21] Appl. No.: 101,319

[22] Filed: Dec. 7, 1979

[51] Int. Cl.³ .......................................... H03K 21/30
[52] U.S. Cl. .................................. 377/33; 364/200; 178/22.14; 377/44
[58] Field of Search ...................... 235/92 DE, 92 SH; 364/200 MS File, 900 MS File; 178/22; 179/1.5 R

[56] References Cited

U.S. PATENT DOCUMENTS

| | | | |
|---|---|---|---|
| 3,651,483 | 3/1972 | Clark et al. | 364/200 |
| 3,691,472 | 9/1972 | Bohman | 178/22 |
| 3,742,460 | 6/1973 | Englund | 364/200 |
| 3,784,743 | 1/1974 | Schroeder | 178/22 |
| 4,042,913 | 8/1977 | Birney et al. | 364/200 |
| 4,064,489 | 12/1977 | Babb | 364/200 |
| 4,068,300 | 1/1978 | Bachman | 364/200 |
| 4,086,628 | 4/1978 | Woodrum | 364/200 |
| 4,099,242 | 7/1978 | Houston et al. | 364/200 |
| 4,115,657 | 9/1978 | Morgan | 178/22 |
| 4,157,454 | 6/1979 | Becker | 364/900 |
| 4,290,105 | 9/1981 | Cichelli et al. | 364/200 |

OTHER PUBLICATIONS

D. E. Knuth, "The Art of Computer Programming", vol. 3, pp. 506-549, 1973.

Primary Examiner—Joseph M. Thesz
Attorney, Agent, or Firm—J. T. Cavender; Edward Dugas; Donald P. Gillette

[57] ABSTRACT

Hashing of a key data signal is accomplished by utilizing a pseudo random number signal generator for generating a randomized signal in response to the key data signals and an output register for serially receiving the generated pseudo-random signal and for providing segments of the serially-received signal at its output. A counting circuit responsive to a preselected number of shift signals provides an output valid signal when the preselected number of shift signals has occurred and further shifts the pseudo-random number signal generator an amount corresponding to the preselected number of shift signals. The method of the present invention utilizes the steps of presetting the pseudo-random number generator and the counting circuit to an initialized state. The counting circuit is then loaded with a predetermined count whereupon key data is entered into the pseudo-random number generator so as to randomize the key data. A valid signal is provided when a block of key data has been hashed and the steps of entering the key data and providing a valid signal upon the occurrence of each block of key data is repeated until all key data blocks have been hashed.

2 Claims, 8 Drawing Figures

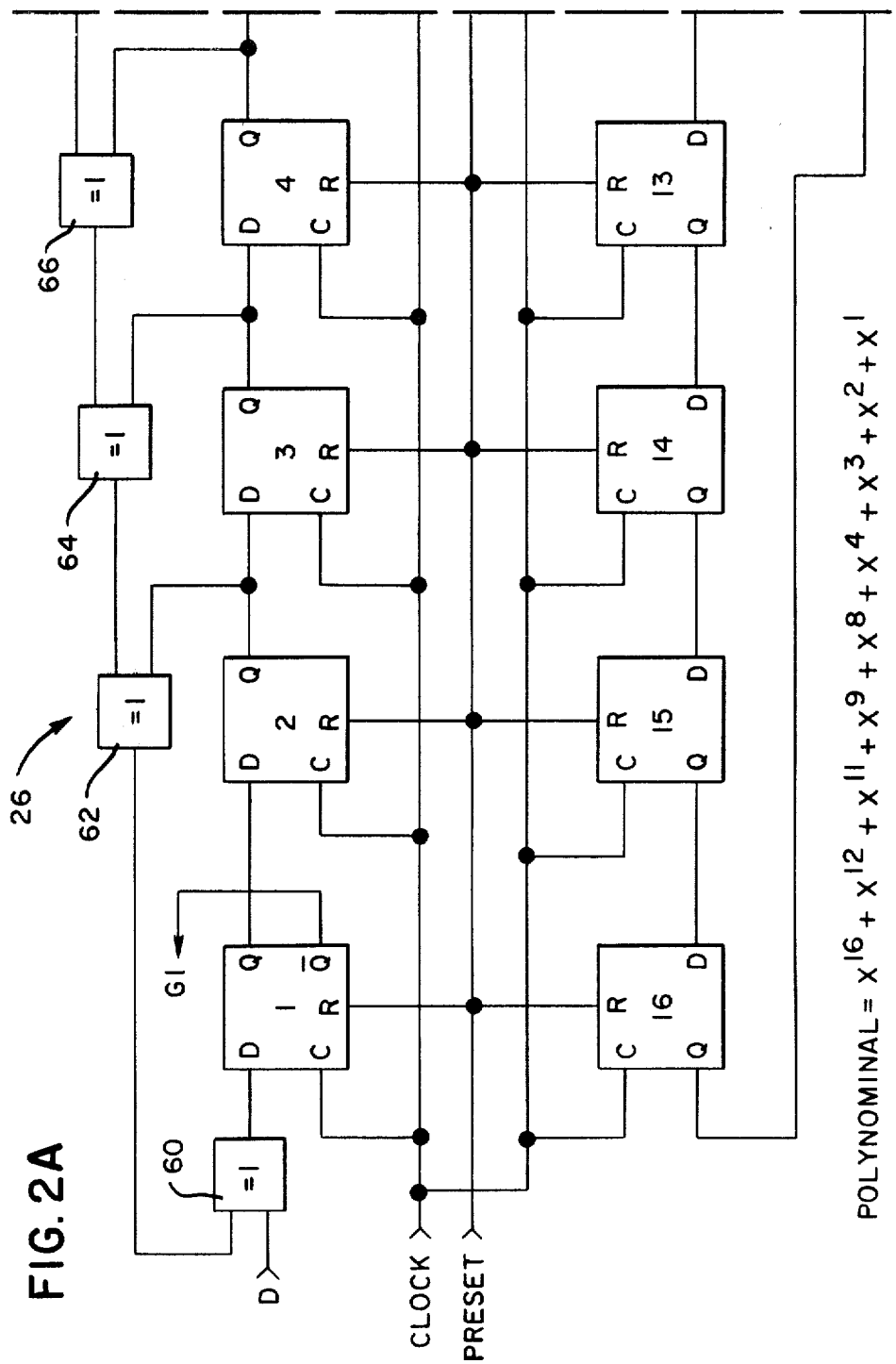

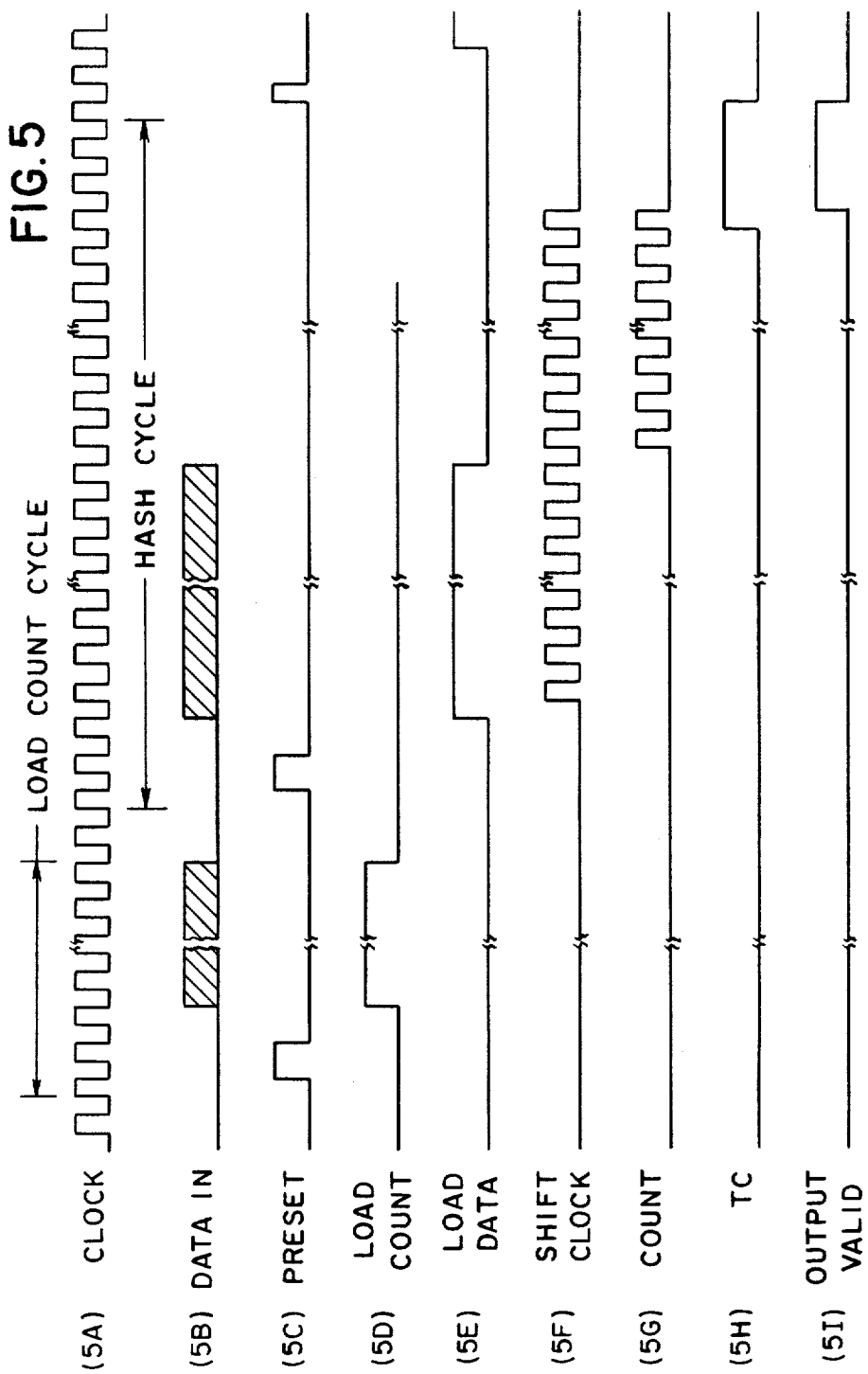

DATA HASHING METHOD AND APPARATUS

BACKGROUND OF THE INVENTION

In computerized processing of data, it is common practice to store like data items as multiple entries within a named data file. A portion of each record, referred to as the key, is used to reference a specific record. The keys are assumed to be unique throughout the file. Fundamental to the processing of the data file is the search for a data record associated with a specific key. A number of techniques have been developed which perform this particular function. A class of these techniques is referred to as hashing access methods.

A hashing access method is commonly used when the number of actual keys is a small percentage of the total number of possible keys. This generally occurs when the key data is represented as ASCII character codes. An example is a 6-digit part number ranging from 000000 to 999999, which requires a 6-byte field (48 bits) with only ten valid values for each byte out of a possible 256 unique values. Another example is the use of a person's name as the key. In this case a fixed length field (say 20 bytes) is allocated for key data. Since all names do not contain 20 characters and certain combinations of letters do not realistically represent a name, a high percentage of possible bit configurations will never be used as valid keys.

A distinguishing property of hashing methods is that they do not uniquely map keys to record storage locations. Instead, they provide for more than one key to map to a specific table entry which contains the location of one or more records. The object of effective hashing methods is to arrive at a uniform distribution of the number of keys which map to a specific starting pointer thus minimizing the search time for any randomly selected key.

Research done on hashing algorithms has produced a variety of methods, each one tailored to a specific set of properties possessed by the keys, that is, alpha keys, alpha-numeric keys, numeric keys, closeness of adjacent keys, number of repeated characters in the keys, etc. For software implemented hashing techniques, it may be acceptable to support several methods and allow the user to choose the most efficient based on his analysis of the key set to be used. The present invention has as an object the elimination of the need to support a variety of hashing methods by randomizing the data within the key such that all original properties of closeness, adjacency, and orderliness are removed.

The following patents are representative of the state of the art as known by applicants: U.S. Pat. Nos. 3,651,483, 3,742,460, 4,042,913, 4,064,489, 4,068,300, 4,086,628, 4,099,242.

The following three publications represent some teachings related to hashing techniques. The Art of Computer Programming, Vol. 3, published by Addison-Wesley Publishing Company, pages 506–549 offered by D. E. Knuth. Assembler Language for FORTRAN, COBOL, and P.L./I Programmers, IBM 370/360, pages 69–70 by S. S. Kuo published by Addison-Wesley Publishing Company. Hash table methods by W. D. Maurer and T. G. Lewis, published by the Association for Computing Machinery.

SUMMARY OF THE INVENTION

The present invention is directed to a method and apparatus for hashing digital data in key blocks. The apparatus is comprised of a pseudo-random signal generator, the signals of which are derived from data signals and the output of which is directed to an output register which is adapted serially to receive the generated pseudo-random signal and to store the signal for providing segments of the signal in parallel at the output. A counting circuit responsive to a preselected number of shift signals provides an output valid signal responsive to the occurrence of the preselected number of shift signals so as to provide an indication of the availability of valid data at the output of the output register. The method of hashing key data utilizes the preceding described apparatus and comprises the steps of presetting the pseudo-random number generator and the counting circuit to an initialized state, thereafter loading a predetermined count into the counting circuit and entering key data into this pseudo-random number generator to randomize the key data. The next step is to provide a valid signal when a block of key data has been hashed. The last two steps are repeated until all desired key data has been hashed.

From the foregoing it can be seen that it is a primary object of the present invention to provide an improved apparatus and method for hashing digital data.

It is another object of the present invention to eliminate the need to support a variety of hashing methods by randomizing the data within the key blocks such that all original properties of closeness, adjacency, and orderliness are removed.

It is an object of the present invention to provide apparatus which is independent of key length in its hashing properties.

It is another object of the present invention to provide a hardware implemented apparatus for performing the hashing function. These and other objects of the present invention will become more apparent when taken in conjunction with the following description and drawings wherein like characters indicate like parts and which drawings form a part of the present invention.

BRIEF DESCRIPTION OF THE DRAWINGS

FIGS. 2A and 2B are a logic schematic of a fist generator which may be used in the preferred apparatus of FIGS. 1A and 1B.

FIG. 5 is a timing diagram useful in understanding the operation of the preferred apparatus embodiment of the present invention.

DESCRIPTION OF THE PREFERRED EMBODIMENT

Figure 1A:
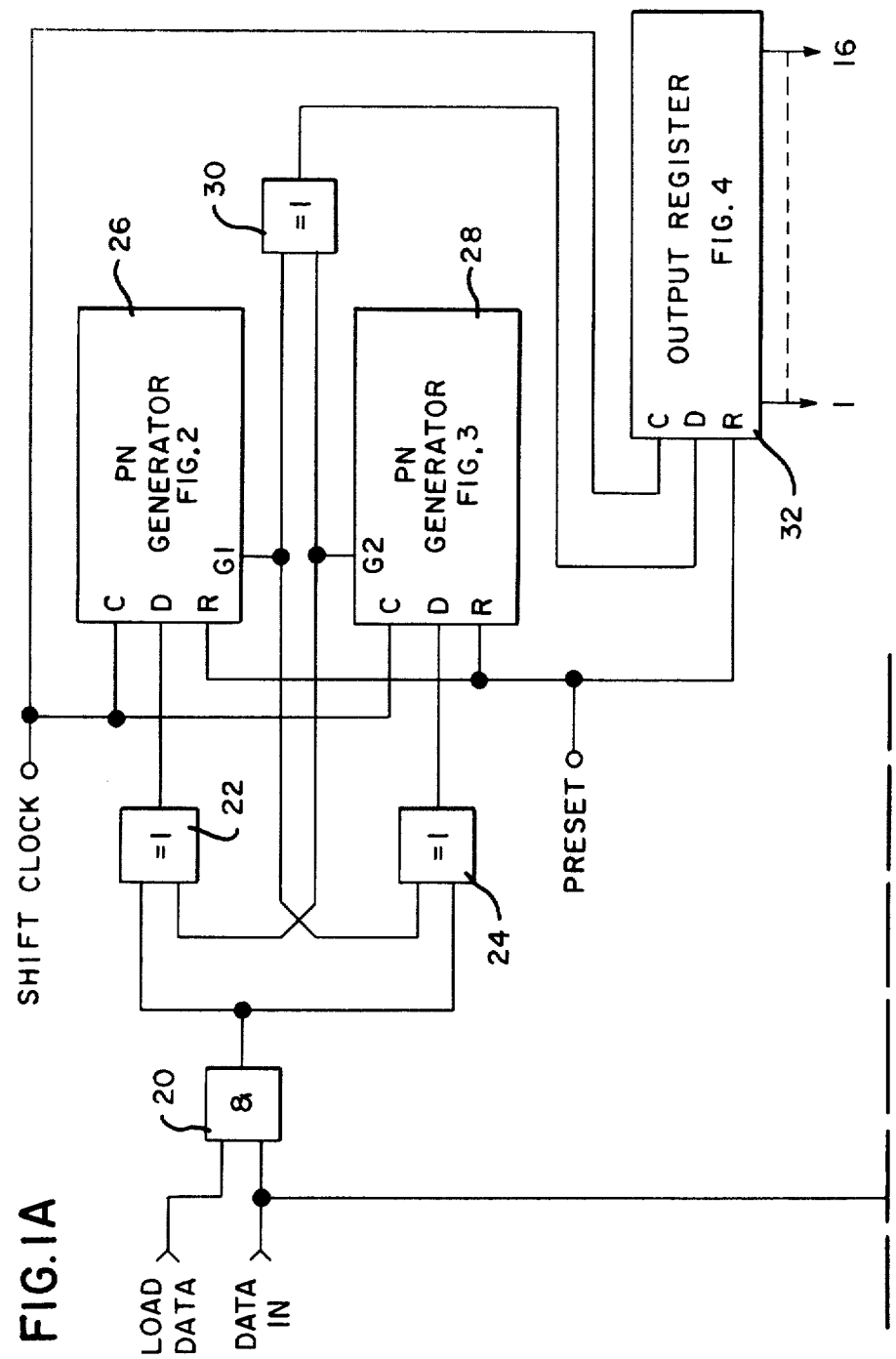
FIGS. 1A and 1B are a block schematic of the preferred apparatus of the present invention.
Figure 1B:
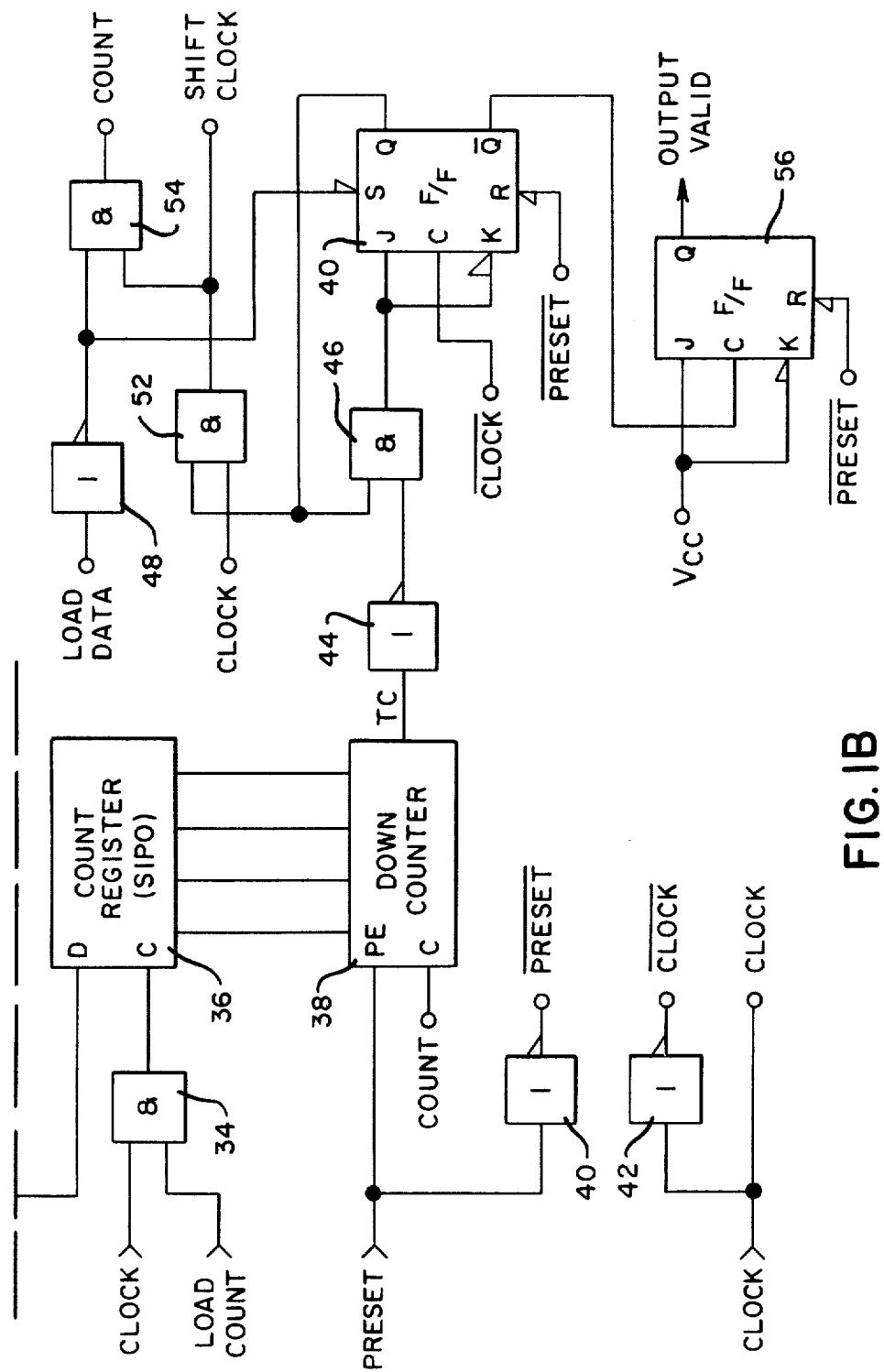

Referring to FIGS. 1A and 1B; the AND gate 20 receives two inputs; a LOAD DATA input and a DATA IN input. The output of AND gate 20 is directed to inputs of Exclusive OR gates 22 and 24. The outputs of Exclusive OR gates 22 and 24 are directed to the inputs of pseudo-random number generators 26 and 28, respectively. These gates logically operate to combine DATA IN with bits from the pseudo-random number generators 26 and 28. The generator inputs are labeled D. Each generator has a clocking input, labeled C for receiving a SHIFT CLOCK signal, and a preset input, labeled R, for receiving a PRESET signal. A clocking signal applied to input C causes the generators, which are in the preferred embodiment shift registers, to shift the contents through the register. The PRESET signal initializes the generators to a starting condition. The output of generator 26 is directed to an input of an Exclusive OR gate 30 and to the input of Exclusive OR gate 24. The output from generator 28 is directed to the other input of Exclusive OR gate 30 and to an input of Exclusive OR gate 22. The output of Exclusive OR gate 30 is directed to the D input of an output register 32. The clocking input C of output register 32 is adapted to receive the SHIFT CLOCK signal. The output register 32 in the preferred embodiment of the invention is a serial-in, parallel-out shift register of sixteen stages with each of the output stages labeled from 1-16. A more detailed description of cross-coupled pseudo-random number generators is contained in U.S. patent application Ser. No. 30,252 filed Apr. 16, 1979, now U.S. Pat. No. 4,264,781 entitled "Real-Time Bit-Oriented Enciphering/Deciphering Device", by D. D. Osterbaan and G. J. Williams, the inventors of the present invention. The present patent application and the aforereferenced patent application are both assigned to NCR Corporation.

A serial-in, parallel-out count register 36 is adapted to receive the DATA IN signal on its D input. A LOAD COUNT signal is addressed to an input of an AND gate 34 and gated by a CLOCK signal applied to the other input of AND gate 34, and the output of AND gate 34 coupled to the clock input, labeled C of count register 36. A Down counter 38 receives the PRESET signal on its PE labeled input and a COUNT signal on its C labeled input. The PRESET signal is inverted by an inverter 40 to provide a $\overline{\text{PRESET}}$ signal and the CLOCK signal is inverted by an inverter 42 to provide a $\overline{\text{CLOCK}}$ signal. The output of the down counter 38 which output is the terminal count TC is directed to an inverter 44. The output of inverter 44 is connected to an input of AND gate 46. The output of AND gate 46 is connected to the J and K inputs of a JK flip-flop 50. The LOAD DATA signal is directed to an inverting amplifier 48, the output of which is connected to the set input, labeled S, of flip-flop 50, and to an input of an AND gate 54. The Q output of flip-flop 50 is connected as an input to AND gate 52 and to AND gate 46. The PRESET signal is applied to the R labeled input of flip-flop 50, and the $\overline{\text{CLOCK}}$ signal is applied to the C labeled input. The CLOCK signal is applied to the other input of AND gate 52. The output of AND gate 52 is the SHIFT CLOCK signal which also is applied to the other input of AND gate 54 and to the C labeled input of generators 26 and 28. The output of AND gate 54 is the COUNT signal. The $\overline{\text{Q}}$ output of flip-flop 50 is directed to the C labeled input of a J-K flip-flop 56. A voltage $V_{cc}$ is applied to the J and K labeled inputs to flip-flop 56. The $\overline{\text{PRESET}}$ signal is applied to the R labeled input of flip-flop 56. The output of flip-flop 56 is taken from the Q labeled output. The output signal is designated OUTPUT VALID.

Figure 2B:
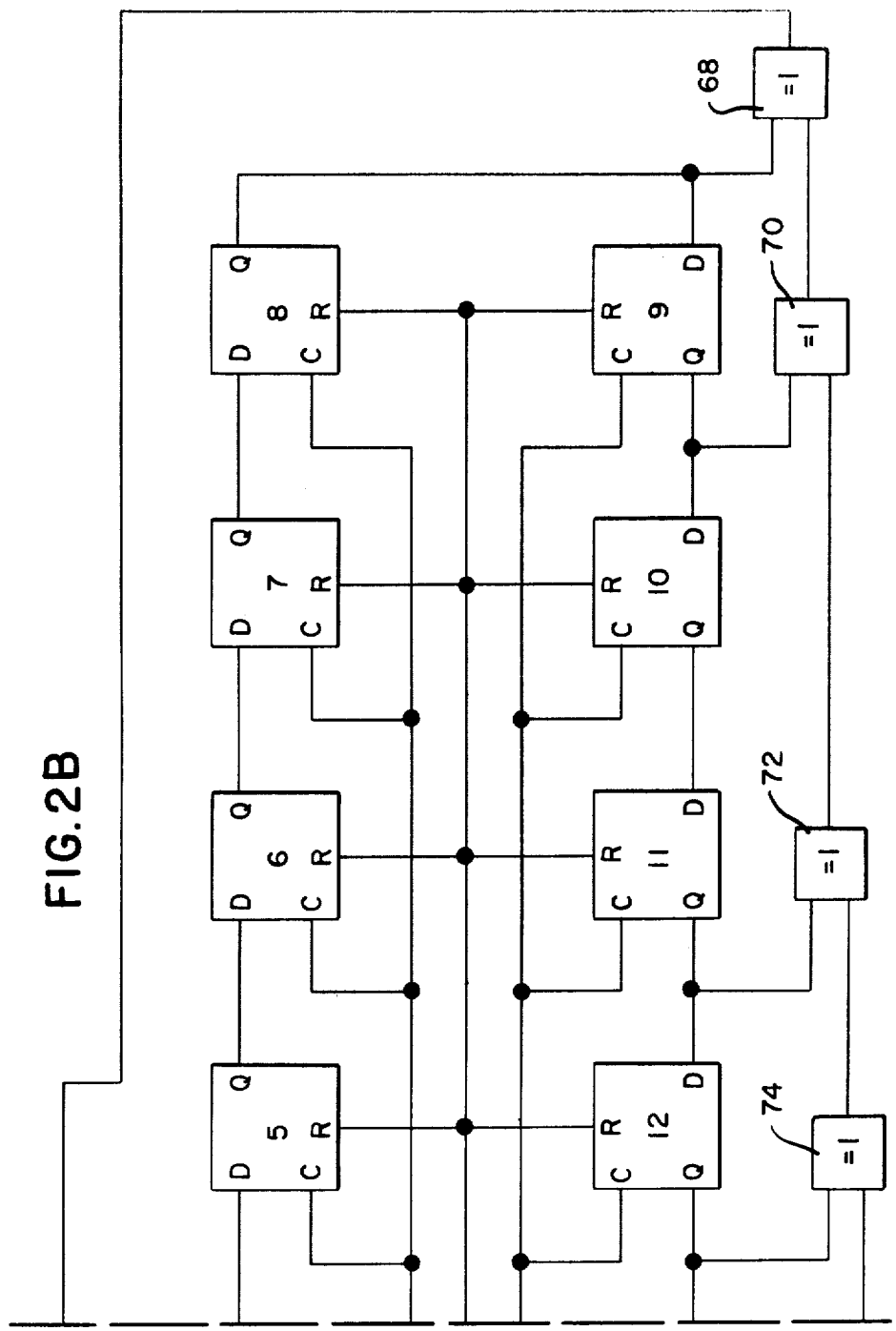

A pseudo random number generator suitable for use as generator 26 is disclosed in FIGS. 2A and 2B. A string of sixteen D-type flip-flops are connected in serial fashion with the Q output of each flip-flop being connected to the D input of the following flip-flop.

Each of the D-type flip-flops labeled 1-16 is clocked by the CLOCK signal applied to the C labeled inputs. The PRESET signal is applied to each of the R labeled inputs of the sixteen flip-flops to reset the register to an initial condition.

In the preferred embodiment of this invention generator 26 was designed to generate a random number polynomial $x^{16}+x^{12}+x^{11}+x^9+x^8+x^4+x^3+x^2+1$. This was accomplished by Exclusive ORing each of the first shift register outputs which correspond in number to the exponent of the to be simulated polynomial, for which, $x^{16}$ is simulated by taking the Q output from the D flip-flop numbered 16 and by providing it as an input to an Exclusive OR gate 74. In a like manner, the output of flip-flop 12 is directed to the other input of Exclusive OR gate 74 to simulate the terms $x^{16}+x^{12}$. Correspondingly, the output from flip-flop 11 is combined in Exclusive OR gate 72 with the output from Exclusive OR gate 74 and the output of flip-flop 9 is combined in Exclusive OR gate 70 with the output from Exclusive OR gate 72. Exclusive OR gates 68, 66, 64 and 62, in a like manner, simulate the $x^8+x^4+x^3+x^2$ elements of the polynomial. The output of the Exclusive OR gate 62 is then directed back to the input of an Exclusive OR gate 60 to provide a closed loop path. The last remaining term is derived from the $\overline{\text{Q}}$ output of flip-flop 1, which output is labeled G1 and is the output of the pseudo generator 26. The Exclusive OR gate 60 receives as its other input the D signal which data signal is combined on a bit by bit basis with the bits received from the output of Exclusive OR gate 62.

Figure 3A:
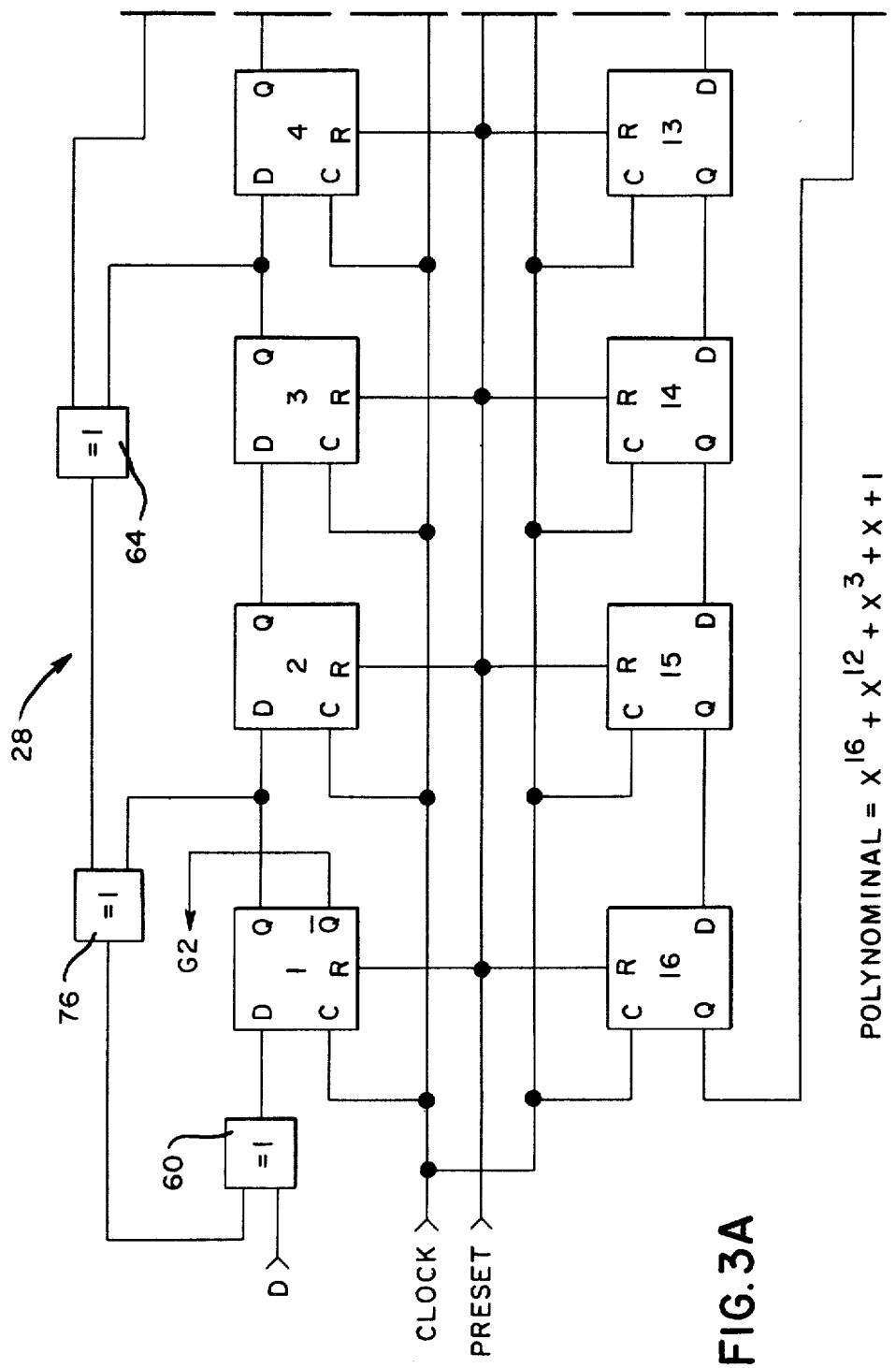
FIGS. 3A and 3B are a logic schematic of a second generator which may be used in conjunction with the first generator of FIGS. 2A and 2B.
Figure 3B:
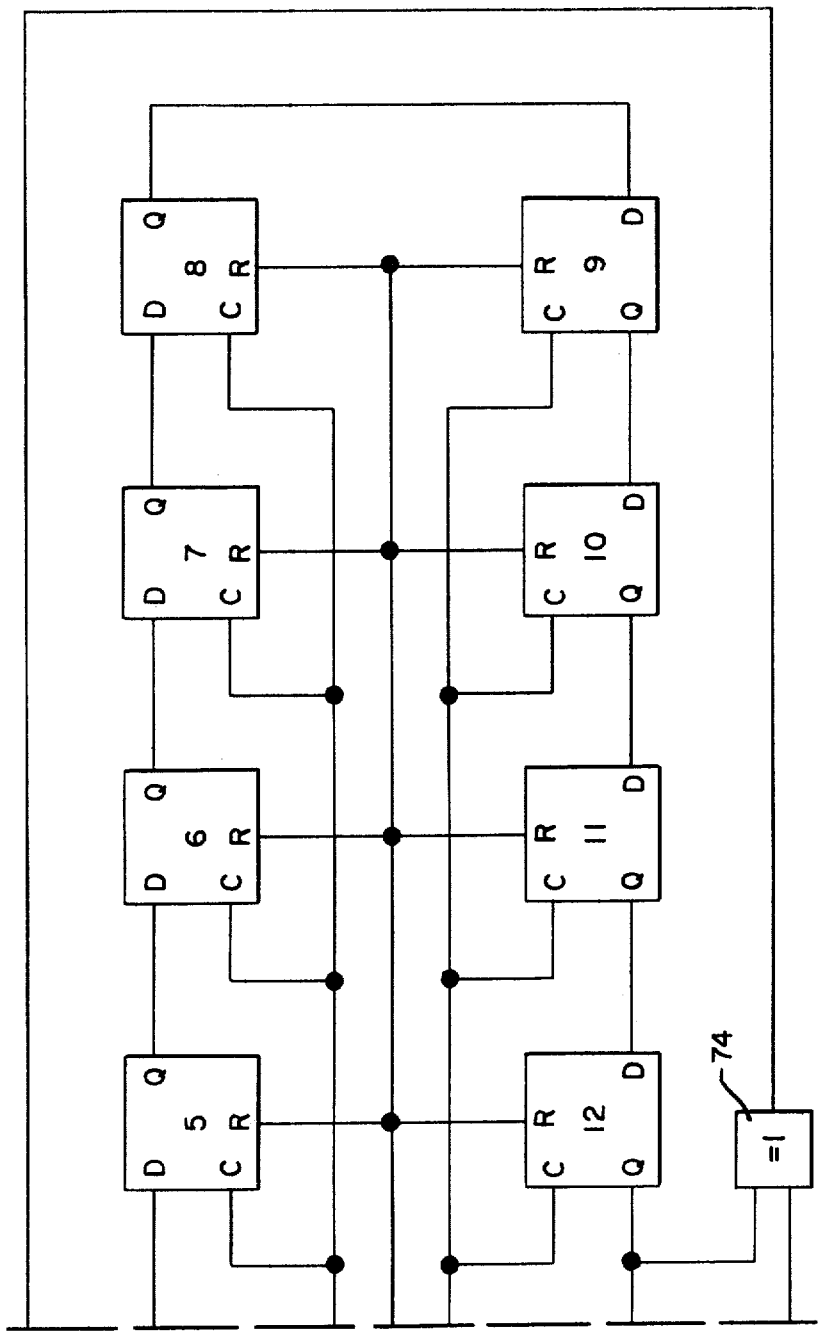

Referring now to FIGS. 3A and 3B, the pseudo random number generator 28 is shown comprised of sixteen serially connected D-type flip-flops labeled 1 through 16. The Q output of each flip-flop is connected to the D input of the succeeding flip-flop. In the preferred embodiment of the invention, pseudo random number generator 28 was designed to implement the polynomial $x^{16}+x^{12}+x^3+x+1$. The reset input to each flip-flop is labeled R. The D signal which is received from the Exclusive OR gate 24 is directed to one input of Exclusive OR gate 60. The output of each flip-flop is labeled according to the flip-flop's position in the serial string and corresponds to a bit position in a sixteen bit signal.

Figure 4:
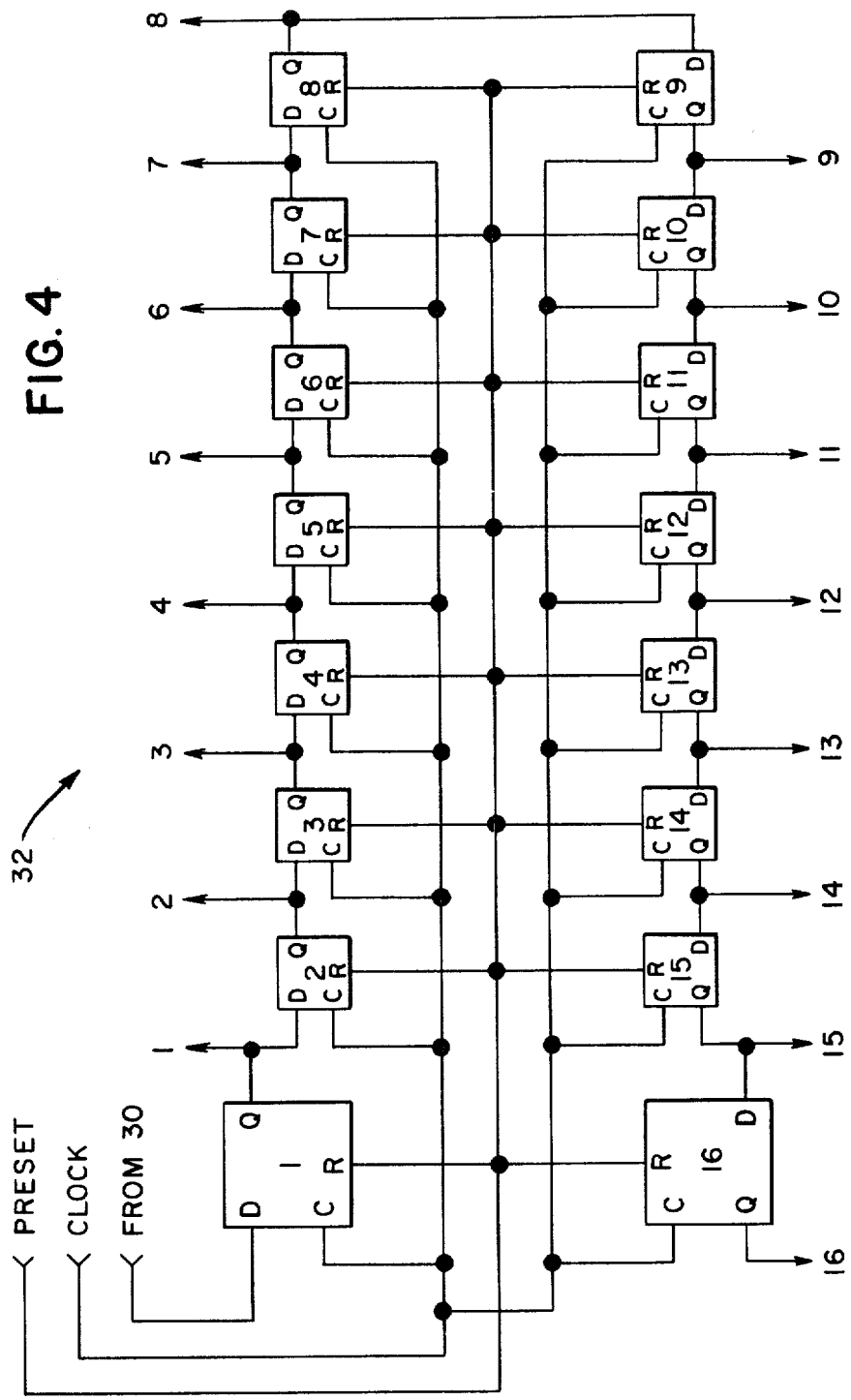
FIG. 4 is a logic schematic of a register which may be used in the preferred apparatus of FIGS. 1A and 1B.

Referring to FIG. 4, the output register 32 is illustrated comprised of 16 D-type flip-flops serially connected with the Q output of each flip-flop connected to the D input of the succeeding flip-flop. The CLOCK and PRESET signals are applied to the C and D labeled inputs on each of the 16 flip-flops. The output from output register 32 is taken from the Q output of each of the flip-flops and corresponds to 16 bits of a block of hashed key data.

The hardware implementation of the preferred embodiment of the invention has been set forth above. In operation, the purpose of the apparatus is to randomize (hash) blocks of key data consisting of N bits to a table address space consisting of $2^K$ entries where K is much less than N. This process is accomplished by utilizing the presettable pseudo-random number generator and the counting circuit in the following steps:

1. Presetting the pseudo-random number generator and the counting circuit to an initialized state.
2. Loading a predetermined count into the counting circuit.
3. Entering key data into the pseudo-random number generator to randomize the key data.

4. Complete the key data randomizing and provide an output valid signal in accordance with the count in the counting circuit.
5. Repeating steps 2, 3 and 4 until all desired key data has been hashed.

Referring to FIGS. 2A and 2B in conjunction with FIGS. 5A–5I, the apparatus is initialized by the PRESET signal (FIG. 5C) being applied to the various preset terminals to set the OUTPUT VALID signal low and to inhibit internal clocks. The constant value K is loaded into the count register 36 by raising the LOAD COUNT signal (FIG. 5D) to a high level and presenting the DATA IN signal (FIG. 5B) representing the constant value K, bit by bit, on the DATA IN input terminal. This data is then clocked (FIG. 5A) serially into the count register 36 during the LOAD COUNT CYCLE. The value of the constant should be equal to the number of bits in the output register 32 that are used for the hash address. In the preferred embodiment of the invention, K was limited to Hex FF and the number of outputs of the output register 32 were therefore limited to sixteen. After the count register 36 is loaded, activating the PRESET signal (FIG. 5C) again will transfer this value into the down counter 38 and will initialize the pseudo random number generators 26 and 28. A block of key data may then be loaded bit by bit onto the DATA INPUT line to AND gate 20 and count register 36. Activating the LOAD DATA signal (FIG. 5E) enables the key data to be directed to the cross-coupled pseudo random number generators 26 and 28. The LOAD DATA signal going true enables the SHIFT CLOCK signal (FIG. 5F) for the generators 26 and 28 and the serial-to-parallel output register 32. The LOAD DATA going false enables the COUNT signal (FIG. 5G) to the down counter 38. The shift clock signal and the COUNT signal will continue until the terminal count TC (FIG. 5H) is reached in the down counter 38. The terminal count signal will disable the SHIFT CLOCK and the COUNT signal and set the output of flip-flop 56 to indicate an OUTPUT VALID signal. On receipt of the OUTPUT VALID signal, the outputs present on the terminals 1–16 of the output register 32 will be valid hashed data.

In the preferred embodiment of the invention, the outputs from each of the pseudo random number generators is cross-coupled to the input of the other pseudo random generator so as to further scramble (or encode) a DATA IN signal. Exclusive ORing of the output from each of the pseudo random number generators insures a high degree of randomness to the DATA IN signal. The randomized signal is then applied to the output register which register accumulates a selected number of data transitions or data bits, in this case, sixteen bits of data and outputs the data in blocks of sixteen.

From the aforementioned description of the preferred embodiment of the invention, it can be seen that there is an advantage in that a uniform distribution of key mappings into the table address space as the number of keys becomes large relative to the size of the table address space is provided and that the apparatus removes any properties which the original keys may have, such as determinate relationship to each other. In addition, the apparatus is independent of the key length.

While there has been shown what is considered to be the preferred embodiment of the invention, it will be manifest that many modificaions may be made therein without departing from the essential spirit of the invention. It is intended, therefore, in the annexed claims to cover all such changes and modifications as may fall within the true scope of the invention.

What is claimed is:

1. A randomizing apparatus characterized by:
   data signal input means;
   first and second pseudo-random generators (26 and 28) each having an input and an output operatively connected in a cross-coupled configuration (22 and 24) for generating a pseudo-random signal in response to data signals;
   logic means (20) for coupling the data signal input means to the input of said first and said second pseudo-random generators (26 and 28);
   output register means (32) adapted to serially receive said generated pseudo-random signal for providing a segment of said serially received signal in parallel at its outputs; and
   programmable counting means (36–56) for counting count pulses, said counting means having an input terminal operatively connected to said data signal input means and being adapted to receive a predetermined number, said predetermined number having a value equal to the number of bits that are to be used to form the segment in said output register means, said counting means further providing an output valid signal when said counted counting pulses corresponds to said predetermined number, thereby indicating the availability of the segment of said generated pseudo-random signal at the outputs of said output register means.

2. The randomizing apparatus according to claim 1 wherein said first and second pseudo-random generators (26 and 28) are shift registers which shift in response to a clock signal and further comprising:
   a source of clock signals (42);
   means (44, 46, 40, and 52) for applying said clock signals to said first and second pseudo-random generators when data signals are to be randomized; and
   wherein said programmable counting means (36–56) counts clock signals, said counting means providing a terminal signal for disabling the clocking signals to said pseudo-random generators and for providing said output valid signal when the counted clock pulses correspond to the predetermined number thereby indicating the availability of the segment of said generated pseudo-random signal at the outputs of said output register means.

* * * * *